US012731790B2

(12) United States Patent
Kim et al.

(10) Patent No.: US 12,731,790 B2
(45) Date of Patent: Sep. 8, 2026

(54) CARBON NANOTUBE DISPERSION, AND NEGATIVE ELECTRODE SLURRY, NEGATIVE ELECTRODE, AND LITHIUM SECONDARY BATTERY INCLUDING THE SAME

(71) Applicant: LG Energy Solution, Ltd., Seoul (KR)

(72) Inventors: Dong Hyun Kim, Daejeon (KR); Houng Sik Yoo, Daejeon (KR); Il Jae Moon, Daejeon (KR); Sang Hoon Choy, Daejeon (KR); Hyeon Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1206 days.

(21) Appl. No.: 17/441,935

(22) PCT Filed: Aug. 21, 2020

(86) PCT No.: PCT/KR2020/011175
§ 371 (c)(1),
(2) Date: Sep. 22, 2021

(87) PCT Pub. No.: WO2021/034145
PCT Pub. Date: Feb. 25, 2021

(65) Prior Publication Data

US 2022/0166027 A1 May 26, 2022

(30) Foreign Application Priority Data

Aug. 21, 2019 (KR) ........................ 10-2019-0102591

(51) Int. Cl.

| | |
|---|---|
| ***H01M 4/62*** | (2006.01) |
| ***H01M 4/13*** | (2010.01) |
| ***H01M 4/134*** | (2010.01) |
| ***H01M 10/05*** | (2010.01) |
| *H01M 4/02* | (2006.01) |
| *H01M 10/0525* | (2010.01) |

(52) U.S. Cl.
CPC ........... *H01M 4/625* (2013.01); *H01M 4/134* (2013.01); *H01M 2004/027* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2010/0248034 | A1* | 9/2010 | Oki | H01M 4/139 252/182.1 |
| 2011/0204296 | A1* | 8/2011 | Conzen | B29C 48/022 252/502 |
| 2014/0093775 | A1 | 4/2014 | Hardman et al. | |
| 2016/0020466 | A1 | 1/2016 | Ulbrich et al. | |
| 2017/0373319 | A1 | 12/2017 | Endo et al. | |
| 2020/0243848 | A1* | 7/2020 | Kim | H01M 4/625 |
| 2020/0358064 | A1* | 11/2020 | Kwon | H01M 50/451 |

FOREIGN PATENT DOCUMENTS

| | | | | |
|---|---|---|---|---|
| CN | 102535142 | A | 7/2012 | |
| CN | 105074966 | A | 11/2015 | |
| CN | 106905495 | * | 6/2017 | C08K 7/24 |
| JP | 2009298625 | A | 12/2009 | |
| JP | 2010195671 | A | 9/2010 | |
| JP | 2012252824 | A | 12/2012 | |
| JP | 5759771 | B2 | 8/2015 | |
| JP | 2016-054113 | A | 4/2016 | |
| JP | 2016-514080 | A | 5/2016 | |
| JP | 6527626 | B1 | 6/2019 | |
| KR | 20140009927 | A | 1/2014 | |
| KR | 20150060863 | A | 6/2015 | |
| KR | 20180054355 | A | 5/2018 | |
| KR | 101946310 | B1 | 2/2019 | |
| KR | 20190065172 | A | 6/2019 | |
| KR | 1020190065172 | * | 6/2019 | H01M 10/0525 |
| WO | 2019112323 | A1 | 6/2019 | |
| WO | WO 2019112323 | * | 6/2019 | H01M 10/052 |

OTHER PUBLICATIONS

Lin et al., Tannic acid adsorption and its role for stabilizing carbon nanotube suspensions, Environmental Science & Technology, vol. 42, No. 16, Jun. 2008, pp. 5917-5923. (Year: 2008).*
Al-Hamadani et al., Stabilization and dispersion of carbon nanomaterials in aqueous solutions: A review; Nov. 2, 2015, Separation and Purification Technology, vol. 56, pp. 861-874. (Year: 2015).*
Al-Hamadani et al., Stabilization and dispersion of carbon nanomaterials in aqueous solutions: A review; 2015; Separation and Purification Technology; vol. 136; pp. 861-874. (Year: 2015).*
Alpatova, A. L. et al., "Single-walled carbon nanotubes dispersed in aqueous media via non-covalent functionalization: Effect of dispersant on the stability, cytotoxicity, and epigenetic toxicity of nanotube suspensions", Water Research, Elsevier, Amsterdam, NL, vol. 44, No. 2, Jan. 1, 2010, pp. 505-520.
Extended European Search Report for Application No. 20855461.8 dated Jun. 22, 2022. 9 pgs.
Search report from International Application No. PCT/KR2020/011175, mailed Nov. 26, 2020.
Al-Hamadani, Yasir A.J., et al., "Stabilization and dispersion of carbon nanomaterials in aqueous solutions: A review." Separation and Purification Technology, Nov. 2, 2015, vol. 56, pp. 861-874.
Lin, et al., "Tannic Acid Asorption and Its Role for Stabilizing Carbon Nanotube Suspensions." Environmental Science & Technology, vol. 42, No. 16, Accepted Jun. 9, 2008, pp. 5917-5923.

* cited by examiner

*Primary Examiner* — Barbara L Gilliam
*Assistant Examiner* — Angela J Martin
(74) *Attorney, Agent, or Firm* — Lerner David LLP

(57) ABSTRACT

A carbon nanotube dispersion includes carbon nanotubes (CNT) having a Brunauer-Emmett-Teller (BET) specific surface area of 800 $m^2/g$ or more, a dispersant, and a water-based solvent, wherein the dispersant includes a polymer dispersant containing an amine and a phenolic compound containing two or more aromatic rings.

14 Claims, No Drawings

CARBON NANOTUBE DISPERSION, AND NEGATIVE ELECTRODE SLURRY, NEGATIVE ELECTRODE, AND LITHIUM SECONDARY BATTERY INCLUDING THE SAME

CROSS-REFERENCE TO RELATED APPLICATIONS

The present is a national phase entry under 35 U.S.C. § 371 of International Application No. PCT/KR2020/011175 filed on Aug. 21, 2020, which claims priority from Korean Patent Application No. 10-2019-0102591, filed on Aug. 21, 2019, the disclosures of which are incorporated by reference herein.

TECHNICAL FIELD

The present invention relates to a carbon nanotube dispersion, and a negative electrode slurry, a negative electrode, and a lithium secondary battery which include the same, and more particularly, to a carbon nanotube dispersion with low viscosity and little change in viscosity over time, a negative electrode slurry including the carbon nanotube dispersion, and a negative electrode and a lithium secondary battery which are prepared by using the negative electrode slurry.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used. Also, as an electrode for such high-capacity lithium secondary battery, research into a method for preparing an electrode having higher energy density per unit volume by improving electrode density has been actively conducted.

In general, a high-density electrode is formed by molding electrode active material particles having a dimeter of a few μm to a few tens of μm with a high-pressure press, wherein, since the particles may be deformed and a space between the particles may be reduced during the molding process, electrolyte solution permeability is easily reduced.

In order to address such a limitation, a conductive agent having excellent electrical conductivity and strength is being used during the preparation of the electrode. Since the conductive agent is disposed between the electrode active material particles to maintain fine pores between the active material particles even when the electrode active material particles are subjected to the molding process, an electrolyte solution may easily penetrate and excellent electrical conductivity may reduce resistance in the electrode. Among these conductive agents, the use of carbon nanotubes, as a fiber-type carbon-based conductive agent capable of further reducing electrode resistance by forming an electrical conductive path in the electrode, is increasing.

Carbon nanotubes, as a kind of fine carbon fibers, are tube-type carbon fibers with a diameter of 1 μm or less, wherein the carbon nanotubes are expected to be used and practically applied to various fields due to high conductivity, tensile strength, and heat resistance which are caused by their specific structure. However, the carbon nanotubes have a problem in that dispersibility is low due to strong van der Waals attraction between them according to their high specific surface area, and an agglomeration phenomenon may occur.

In order to solve this problem, a method of dispersing carbon nanotubes in a dispersion medium through a mechanical dispersion treatment, such as an ultrasonic treatment, has been proposed. However, with respect to the mechanical dispersion treatment method, the carbon nanotubes may be aggregated at the same time as ultrasonic irradiation is terminated.

Also, attempts to use a silicon-based active material having excellent theoretical capacity as a negative electrode active material have been actively made as the demand for high-capacity batteries has recently increased. However, the silicon-based negative electrode active material has a limitation in that cycle characteristics are poor due to a large volume change during charge and discharge.

Thus, there is a need to develop a carbon nanotube dispersion, which has low viscosity and suppresses an increase in viscosity over time while being able to improve the dispersibility of carbon nanotubes, and a negative electrode material which may improve cycle characteristics when used in a silicon-based negative electrode active material.

DISCLOSURE OF THE INVENTION

Technical Problem

An aspect of the present invention provides a carbon nanotube dispersion which has low viscosity and a low rate of change of viscosity with time and may improve cycle characteristics when used with a silicon-based negative electrode active material, a negative electrode slurry composition including the same, an electrode prepared by using the negative electrode slurry composition, and a lithium secondary battery including the electrode.

Technical Solution

According to an aspect of the present invention, there is provided a carbon nanotube dispersion which includes carbon nanotubes (CNT) having a Brunauer-Emmett-Teller (BET) specific surface area of 800 $m^2/g$ or more, a dispersant, and a water-based solvent, wherein the dispersant includes a polymer dispersant containing an amine and a phenolic compound containing two or more aromatic rings.

According to another aspect of the present invention, there is provided a negative electrode slurry composition including the carbon nanotube dispersion, a silicon-based negative electrode active material, and a binder.

According to another aspect of the present invention, there is provided a negative electrode including a negative electrode active material layer formed by the negative electrode slurry composition, and a lithium secondary battery including the negative electrode.

Advantageous Effects

A carbon nanotube dispersion of the present invention is characterized in that it includes carbon nanotubes having a Brunauer-Emmett-Teller (BET) specific surface area of 800 $m^2/g$ or more, and, in a case in which the carbon nanotubes having a large BET specific surface area as described above are used, an effect of improving cycle characteristics may be obtained when a silicon-based negative electrode active material is used.

However, in the case that the carbon nanotubes having a large BET specific surface area are used, since dispersibility of the carbon nanotubes is reduced, viscosity increases rapidly and a change in viscosity over time due to the formation of a network of the carbon nanotubes occurs, and thus, storability and stability of a conductive agent dispersion may be reduced and processability of an electrode may be reduced. However, since the carbon nanotube dispersion according to the present invention uses a polymer dispersant containing an amine and a phenol compound having a specific structure together, a change in viscosity over time is small and a relatively low viscosity is obtained despite the fact that the carbon nanotubes having a large specific surface area are used.

Thus, if a negative electrode slurry composition containing the carbon nanotube dispersion of the present invention together with a silicon-based negative electrode active material having excellent capacity characteristics is used, a negative electrode and a secondary battery, which have excellent capacity characteristics and cycle characteristics, may be prepared.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

In the present specification, the expression "average particle size $D_{50}$" denotes a particle size at a cumulative volume of 50%. The $D_{50}$, for example, may be measured by using a laser diffraction method. The laser diffraction method may generally measure a particle size ranging from a submicron level to a few mm and may obtain highly repeatable and high-resolution results.

In the present specification, the expression "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

Hereinafter, the present invention will be described in detail.

Carbon Nanotube Dispersion

First, a carbon nanotube dispersion according to the present invention will be described.

The carbon nanotube dispersion according to the present invention includes (1) carbon nanotubes (CNT) having a Brunauer-Emmett-Teller (BET) specific surface area of 800 $m^2/g$ or more, (2) a dispersant, and (3) a water-based solvent, wherein the dispersant includes a polymer dispersant containing an amine and a phenolic compound containing two or more aromatic rings.

(1) Carbon Nanotube

The carbon nanotube is to improve conductivity of an electrode, wherein a graphite sheet has a cylindrical shape with a nano-sized diameter and includes an allotrope of carbon having an sp2 bonding structure and an aggregate thereof. The carbon nanotube aggregate denotes a secondary structure formed by arranging or agglomeration of a plurality of carbon nanotubes. For example, the carbon nanotube aggregate may be bundle-type carbon nanotubes in the form of a bundle or rope in which the plurality of carbon nanotubes are arranged or aligned side by side in a predetermined direction or may be entangled-type carbon nanotubes in the form of a sphere or potato in which the plurality of carbon nanotubes are entangled without a predetermined direction.

The carbon nanotube dispersion of the present invention includes carbon nanotubes having a BET specific surface area of 800 $m^2/g$ or more, preferably 800 $m^2/g$ to 5,000 $m^2/g$, and more preferably 900 $m^2/g$ to 2,000 $m^2/g$. If the carbon nanotubes having a high BET specific surface area as described above are used, since the formation of a conductive network between silicon-based negative electrode active materials is excellent, an effect of improving cycle characteristics of a secondary battery may be obtained.

With respect to the carbon nanotubes having a high BET specific surface area as used in the present invention, since viscosity of the carbon nanotube dispersion is high due to very high cohesion between the carbon nanotubes, stability of the dispersion is not only poor, but an excessive amount of the carbon nanotubes must also be used to sufficiently form a conductive path, and thus, a decrease in amount of the active material in an active material layer may cause a decrease in electrode performance. Thus, there was a difficulty in commercializing the carbon nanotubes having a high specific surface area as a conductive agent.

However, according to the research of the present inventors, in a case in which a polymer dispersant containing an amine and a phenolic compound containing two or more aromatic rings, which will be described later, are used together in the carbon nanotube dispersion, it was found that, despite the use of the carbon nanotubes having a large specific surface area as described above, initial viscosity was low due to excellent dispersibility of the carbon nanotubes, and a change in viscosity over time was suppressed.

Therefore, in a case in which the carbon nanotube dispersion of the present invention is used in the preparation of an electrode slurry, since the carbon nanotubes are uniformly disposed between the active materials, a fine space between the electrode active materials may be constantly maintained even during the preparation of the electrode by coating and drying the electrode slurry and then rolling. Also, since the carbon nanotubes are not agglomerated and distributed uniformly, a conductive path may be sufficiently formed even with a small amount of the carbon nanotubes.

The carbon nanotube used in the present invention may be a single-walled carbon nanotube (SWCNT), a double-walled carbon nanotube (DWCNT), or a combination thereof, but the carbon nanotube is not limited thereto. The single-walled carbon nanotube or double-walled carbon nanotube has a higher specific surface area than a multi-walled carbon nanotube, and, accordingly, the single-walled carbon nanotube or double-walled carbon nanotube is more effective in improving cycle characteristics of a battery in which the silicon-based negative electrode active material is used.

The carbon nanotube may have an average diameter of 0.6 nm to 10 nm, preferably 0.8 nm to 5 nm, and more preferably 0.8 nm to 3 nm. Also, the carbon nanotube may have an average length of 0.5 μm to 20 μm, preferably 0.5 μm to 10 μm, and more preferably 0.5 μm to 5 μm. In a case in which the average diameter and average length of the carbon nanotube satisfy the above ranges, it is effective in reducing the viscosity of the dispersion and improving storage stability, and excellent cycle characteristics may be achieved even when the silicon-based negative electrode active material is used.

In this case, the average diameter of the carbon nanotube may be measured by photographing carbon nanotube powder with a scanning electron microscope, and the average length of the carbon nanotube may be measured by photographing the carbon nanotube dispersion with a scanning electron microscope.

The carbon nanotubes may be included in an amount of 0.01 wt % to 5 wt %, preferably 0.01 wt % to 3 wt %, more preferably 0.1 wt % to 2 wt %, and most preferably 0.1 wt % to 1 wt % based on a total weight of the carbon nanotube dispersion. When the amount of the carbon nanotubes satisfies the above range, an effect of improving the viscosity of the dispersion and an effect of improving the cycle characteristics of the secondary battery are excellent.

(2) Dispersant

The dispersant is to allow the carbon nanotubes to be evenly dispersed without agglomeration in the carbon nanotube dispersion, wherein the carbon nanotube dispersion of the present invention uses a polymer dispersant containing an amine and a phenolic compound containing two or more aromatic rings together as a dispersant. According to the research of the present inventors, it was found that, in a case in which the two specific dispersants are used together, the change in viscosity of the carbon nanotube dispersion over time is significantly reduced.

In the present invention, the dispersant may be included in an amount of 10 parts by weight to 2,000 parts by weight, preferably 50 parts by weight to 1,000 parts by weight, and more preferably 70 parts by weight to 500 parts by weight based on 100 parts by weight of the carbon nanotubes. If the amount of the dispersant is excessively small, the viscosity of the carbon nanotube dispersion may be increased, and, if the amount of the dispersant is excessively large, since the dispersant acts as an impurity after the electrode is prepared, physical properties of the secondary battery may be deteriorated.

The polymer dispersant containing an amine, for example, may include at least one selected from the group consisting of polyvinylpyrrolidone, polyacrylic acid hydrazide, poly-N-vinyl-5-methoxazolidon, N-alkyl polyimine, N-acetyl polyimine, polyacrylamide, poly-L-lysine hydrobromide, benzyl-dodecyl-dimethylammonium chloride, and polyethylenimine.

In a case in which the specific polymer dispersant containing an amine is used in a polymer structure as described above, further improved effect of improving the viscosity and effect of suppressing the change in viscosity over time may be exhibited.

Next, the phenolic compound containing two or more aromatic rings may reduce the viscosity of the carbon nanotube dispersion, particularly a water-based carbon nanotube dispersion and may significantly improve the increase in viscosity over time in comparison to a conventional case due to a bulky structure generated by the two or more aromatic rings and an influence of a hydroxy group included in a phenolic group. In a case in which phenolic compounds containing only one aromatic ring (for example, dopamine, gallic acid, pyrogallol, catechol, etc.) are used, the effect of improving the viscosity of the dispersion and the effect of suppressing the change in viscosity over time were not sufficient.

Preferably, the phenolic compound may include at least one structure selected from the group consisting of a phenolic structure, a catechol structure, a gallol structure, and a naphthol structure in at least one of the aromatic rings, and may specifically include at least one structure selected from the group consisting of a catechol structure and a gallol structure in at least one of the aromatic rings. The phenolic structure is a structure in which two hydroxy groups are bonded to a benzene ring, the catechol structure is a structure in which two hydroxy groups are bonded to a benzene ring, the gallol structure is a structure in which three hydroxy groups are bonded to a benzene ring, and the naphthol structure is a structure in which one hydroxy group is bonded to naphthalene.

In a case in which the phenolic compound containing two or more aromatic rings includes the above structure, since an interaction between the aromatic ring and the carbon nanotube and an interaction by hydrogen bonding between —OH of the phenolic compound and the polymer dispersant are properly balanced in the carbon nanotube dispersion, effects of reducing the viscosity of the carbon nanotube dispersion and suppressing the increase in viscosity over time may be exhibited.

Specific examples of the phenolic compound containing two or more aromatic rings may be at least one selected from the group consisting of baicalin, luteolin, taxifolin, myricetin, quercetin, rutin, catechin, epigallocatechin gallate, butein, piceatannol, and tannic acid, and may preferably be tannic acid, quercetin, or a combination thereof.

In an example of the present invention, the aromatic ring contained in the phenolic compound containing two or more aromatic rings may have a structure in which one aromatic ring, which is not fused with another aromatic ring, or two aromatic rings are fused to each other, and a structure, in which three or more aromatic rings are fused to each other, may not be included.

That is, the inclusion of a structure in which three or more aromatic rings are fused in a molecular structure may be excluded from a range of the phenolic compound containing two or more aromatic rings.

In a case in which the phenolic compound containing two or more aromatic rings includes the structure in which three or more aromatic rings are fused in the molecular structure, since the structure in which the three or more aromatic rings are fused may induce agglomeration between the carbon nanotubes by exerting a more than adequate strong binding force with the carbon nanotubes in the carbon nanotube dispersion, it may not be suitable for improving the dispersibility of the carbon nanotubes. Also, since the balance between the interaction between the aromatic ring and the carbon nanotube and the interaction by the hydrogen bonding between —OH of the phenolic compound and the polymer dispersant in the carbon nanotube dispersion is broken, it may be difficult to properly exhibit the effect of reducing the viscosity of the carbon nanotube dispersion and the effect of suppressing the increase in viscosity over time.

The phenolic compound may be included in an amount of 1 part by weight to 100 parts by weight, preferably 5 parts by weight to 100 parts by weight, and more preferably 10 parts by weight to 100 parts by weight based on 100 parts by weight of the polymer dispersant containing an amine. When the amounts of the polymer dispersant containing an amine and the phenolic compound satisfy the above range, effects of reducing the viscosity of the dispersion and increasing the storage stability are more excellent.

(3) Water-Based Solvent

The solvent is a dispersion medium for dispersing the carbon nanotubes, the polymer dispersant, and the phenolic compound containing two or more aromatic rings, wherein it is used to pre-disperse the carbon nanotubes and supply them as a carbon nanotube dispersion in order to prevent agglomeration when an electrode slurry composition is used by directly mixing the carbon nanotubes with a negative electrode active material.

The solvent may dissolve or disperse the carbon nanotubes, the polymer dispersant, and the phenolic compound containing two or more aromatic rings above a certain level. The water-based solvent, for example, may be water, and the water-based solvent may be included in an amount such that the electrode slurry composition may have appropriate viscosity in consideration of coatability of the electrode slurry composition subsequently prepared by using the carbon nanotube dispersion.

Since the carbon nanotube dispersion of the present invention including the above-described components has excellent dispersibility, the viscosity of the dispersion is low and a degree of increase in viscosity over time is small.

The carbon nanotube dispersion may have an initial viscosity, which is measured at 25° C. and 1 rpm using a viscometer (manufactured by TOKI SANGYO CO., LTD., viscometer TV-22), of 0.1 Pa·s to 12 Pa-s, particularly 0.1 Pa·s to 10 Pa-s, more particularly 0.1 Pa·s to 5 Pa-s, and most particularly 0.1 Pa·s to 3 Pa·s. In a case in which the carbon nanotube dispersion has initial viscosity in the above range, an electrode slurry may be more smoothly prepared by using the carbon nanotube dispersion, and the electrode slurry including the carbon nanotube dispersion may have appropriate viscosity for the formation of the electrode.

Also, when the carbon nanotube dispersion is left standing at 25° C. for 1 week, a viscosity increase rate calculated by the following Equation (1) may be 80% or less, particularly 50% or less, and more particularly 20% or less.

$$\text{Viscosity increase rate (\%)}=\{(\text{viscosity measured after left standing at 25° C. for 1 week}-\text{initial viscosity})/\text{initial viscosity}\}\times 100 \quad \text{Equation (1):}$$

In this case, the viscosity after left standing for 1 week and the initial viscosity were measured at 25° C. and 1 rpm.

The carbon nanotube dispersion of the present invention as described above may be prepared by a preparation method which includes the steps of: (1) preparing a mixture by mixing carbon nanotubes, a polymer dispersant, a phenolic compound containing two or more aromatic rings, and a water-based solvent; and (2) milling the mixture.

In step (1), carbon nanotubes, a polymer dispersant, a phenolic compound containing two or more aromatic rings, and a water-based solvent are mixed to prepare a mixture.

The preparing of the mixture may be performed under temperature conditions in which physical properties including viscosity of the mixture do not change due to evaporation of the water-based solvent. For example, the preparing of the mixture may be performed at a temperature of 50° C. or less, for example, 5° C. to 50° C.

In step (2), the mixture is subjected to a dispersion treatment to prepare a carbon nanotube dispersion.

The milling may be performed by a method using a ball mill, bead mill, disc mill, basket mill, or high pressure homogenizer, and may be more specifically performed by a milling method using a disc mill or high pressure homogenizer.

When milling by the disc mill, a size of beads may be appropriately determined according to type and amount of the carbon nanotubes and a type of the dispersant, and specifically, the bead may have a diameter of 0.1 mm to 5 mm, for example, 0.5 mm to 4 mm. Also, a bead milling process may be performed at a speed of 2,000 rpm to 10,000 rpm, and may be more specifically performed at a speed of 5,000 rpm to 9,000 rpm.

Milling by the high pressure homogenizer, for example, is performed by a force, such as cavitation, shear, impact, and explosion, when the mixture is pressurized with a plunger pump of the high pressure homogenizer and is pushed through a gap of a homogenizing valve so as to pass through the gap.

The milling process may be performed depending on a degree of dispersion of the carbon nanotube dispersion, and may be specifically performed for 30 minutes to 120 minutes, for example, 60 minutes to 90 minutes.

Negative Electrode Slurry Composition

Next, a negative electrode slurry composition according to the present invention will be described.

The negative electrode slurry composition according to the present invention includes the carbon nanotube dispersion according to the present invention, a negative electrode active material, and a binder, and may further include a solvent and/or other additives, if necessary. Since the carbon nanotube dispersion is the same as described above, a detailed description thereof will be omitted.

The negative electrode active material includes a silicon-based negative electrode active material. The silicon-based negative electrode active material may include at least one selected from the group consisting of metallic silicon (Si), silicon oxide ($SiO_x$, where $0<x<2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubidium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and a combination thereof.

Since the silicon-based negative electrode active material has higher capacity characteristics than a carbon-based negative electrode active material, better capacity characteristics may be obtained when the silicon-based negative electrode active material is further included. However, since the silicon-based negative electrode active material has a large volume change during charge and discharge, battery characteristics rapidly degrade when the charge and discharge are repeated so that cycle characteristics are not sufficient, and, as a result, there was a difficulty in commercialization.

However, in a case in which the carbon nanotubes having a large specific surface area are used as a conductive agent as in the present invention, an effect of improving cycle characteristics may be obtained when the silicon-based negative electrode active material is used. Thus, when the negative electrode slurry composition of the present invention including the carbon nanotube dispersion of the present invention and the silicon-based negative electrode active material is used, a secondary battery having excellent capacity characteristics and cycle characteristics may be achieved.

The negative electrode active material may further include other types of negative electrode active materials together with the silicon-based negative electrode active material. As the other types of negative electrode active materials, for example, a carbonaceous material such as artificial graphite, natural graphite, graphitized carbon fibers, and amorphous carbon; a metallic compound alloyable with lithium such as aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SnO_2$, vanadium oxide, and lithium vanadium oxide; or a composite including the metallic compound and the carbonaceous material, such as a Sn—C composite, may be used, and the carbonaceous material among them is particularly preferred.

A total amount of the negative electrode active material, in which the silicon-based negative electrode active material and the other types of negative electrode active material are combined, may be in a range of 70 wt % to 99 wt %, for example, 80 wt % to 98 wt % based on a total solid content in the negative electrode slurry composition. When the amount of the negative electrode active material satisfies the above range, excellent capacity characteristics may be achieved.

The silicon-based negative electrode active material may be included in an amount of 3 wt % or more, preferably 3 wt % to 70 wt %, and more preferably 3 wt % to 50 wt % in the total negative electrode active material. When the amount of the silicon-based negative electrode active material in the total negative electrode active material satisfies the above range, a secondary battery having high capacity and excellent cycle characteristics may be achieved.

Next, the binder is for securing adhesion between the active materials or adhesion of the active material to a current collector, wherein common binders used in the art may be used, and types thereof are not particularly limited. The binder, for example, may include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, a styrene-butadiene rubber (SBR), a fluorine rubber, or copolymers thereof, and any one thereof or a mixture of two or more thereof may be used.

The binder may be included in an amount of 5 wt % or less, for example, 1 wt % to 3 wt % based on the total solid content in the negative electrode slurry composition. In a case in which the amount of the binder satisfies the above range, excellent electrode adhesion may be achieved while minimizing an increase in resistance of the electrode.

The negative electrode slurry composition may further include a solvent, if necessary, for viscosity control. In this case, the solvent may be water, an organic solvent, or a mixture thereof. Examples of the organic solvent may be amide-based polar organic solvents such as dimethylformamide (DMF), diethyl formamide, dimethyl acetamide (DMAc), and N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol mono methyl ether, diethylene glycol mono methyl ether, triethylene glycol mono methyl ether, tetra ethylene glycol mono methyl ether, ethylene glycol mono ethyl ether, diethylene glycol mono ethyl ether, triethylene glycol mono ethyl ether, tetra ethylene glycol mono ethyl ether, ethylene glycol mono butyl ether, diethylene glycol mono butyl ether, triethylene glycol mono butyl ether, or tetra ethylene glycol mono butyl ether; ketones such as acetone, methyl ethyl ketone, methylpropyl ketone, or cyclopentanone; and esters such as ethyl acetate, γ-butyl lactone, and ε-propiolactone, and any one thereof or a mixture of two or more thereof may be used, but the present invention is not limited thereto.

The solvent may be included in an amount such that the solid content in the negative electrode slurry composition is in a range of 30 wt % to 70 wt %, for example, 30 wt % to 50 wt %. In a case in which the solid content in the negative electrode slurry is less than 30 wt %, processing costs may increase due to a decrease in electrode loading amount, electrode adhesion may be reduced due to the occurrence of binder migration, and coating defects may occur. In a case in which the solid content in the negative electrode slurry is greater than 70 wt %, since viscosity of the negative electrode slurry is excessively increased, processability may be reduced and coating defects may occur.

Also, the negative electrode slurry may further include an additive such as a viscosity modifier and a filler, if necessary.

The viscosity modifier may be carboxymethyl cellulose or polyacrylic acid, and the viscosity of the negative electrode slurry may be adjusted to facilitate the preparation of the negative electrode slurry and a coating process on the negative electrode collector by addition.

The filler, as a component suppressing expansion of the electrode, is selectively used, but is not particularly limited as long as it is a fibrous material without causing chemical changes in the battery, and, for example, an olefin-based polymer such as polyethylene and polypropylene; and a fibrous material, such as glass fibers and carbon fibers, may be used.

Negative Electrode

Next, a negative electrode according to the present invention will be described.

The negative electrode of the present invention includes a negative electrode active material layer which is formed by the negative electrode slurry composition according to the present invention, that is, the negative electrode slurry composition including the carbon nanotube dispersion, the silicon-based negative electrode active material, and the binder.

Specifically, the negative electrode may be prepared by applying the above-described negative electrode slurry composition of the present invention and drying to form a negative electrode active material layer. More specifically, the negative electrode active material layer may be formed by a method of coating the negative electrode slurry composition on a negative electrode collector and drying the coated negative electrode collector, or may be formed by a method of coating the negative electrode slurry composition on a separate support and then laminating a film separated from the support on the negative electrode collector. If necessary, the negative electrode active material layer is formed by the above-described method, and a rolling process may then be further performed. In this case, the drying and the rolling may be performed under appropriate conditions in consideration of physical properties of the electrode to be finally prepared, and are not particularly limited.

The negative electrode collector is not particularly limited so long as it is a material having conductivity without causing adverse chemical changes in the battery, and, for example, copper, stainless steel, aluminum, nickel, titanium, alloys thereof, these materials that are surface-treated with one of carbon, nickel, titanium, silver, or the like, or fired carbon may be used.

The negative electrode collector may typically have a thickness of 3 μm to 500 μm, and microscopic irregularities may be formed on the surface of the collector to improve the adhesion of the negative electrode active material. Also, the negative electrode collector, for example, may be used in various shapes such as that of a film, a sheet, a foil, a net, a porous body, a foam body, a non-woven fabric body, and the like.

Lithium Secondary Battery

Next, a secondary battery according to the present invention will be described.

The secondary battery according to the present invention includes the above-described negative electrode of the present invention. Specifically, the secondary battery according to the present invention may include a positive electrode, a negative electrode, a separator disposed between the positive electrode and the negative electrode, and an electrolyte, and, in this case, the negative electrode is the above-described negative electrode of the present invention. Since the negative electrode has been described above, a detailed description thereof will be omitted, and hereinafter, only the other components will be described.

The positive electrode may be one commonly used in the art, and is not particularly limited. For example, the positive electrode may be prepared by applying a positive electrode slurry composition and drying to form a positive electrode active material layer. Specifically, the positive electrode active material layer may be formed by a method of coating the positive electrode slurry composition on a positive electrode collector and drying the coated positive electrode collector, or may be formed by a method of coating the positive electrode slurry on a separate support and then laminating a film separated from the support on the positive electrode collector. If necessary, the positive electrode active material layer is formed by the above-described method, and a rolling process may then be further performed. In this case, the drying and the rolling may be performed under appropriate conditions in consideration of physical properties of the electrode to be finally prepared, and are not particularly limited.

The positive electrode collector is not particularly limited so long as it is a material having conductivity without causing adverse chemical changes, and, for example, copper, stainless steel, aluminum, nickel, titanium, alloys thereof, these materials that are surface-treated with one of carbon, nickel, titanium, silver, or the like, or fired carbon may be used.

The positive electrode collector may typically have a thickness of 3 μm to 500 μm, and microscopic irregularities may be formed on the surface of the collector to improve the adhesion of the positive electrode active material. Also, the positive electrode collector, for example, may be used in various shapes such as that of a film, a sheet, a foil, a net, a porous body, a foam body, a non-woven fabric body, and the like.

The positive electrode slurry composition includes a positive electrode active material, a binder, and a solvent, and may further include a conductive agent and an additive, if necessary.

As the positive electrode active material, positive electrode active materials well known in the art may be used without limitation, and, for example, lithium cobalt-based oxide, lithium nickel-based oxide, lithium manganese-based oxide, lithium iron phosphate, lithium nickel manganese cobalt-based oxide, or a combination thereof may be used. Specifically, $LiCoO_2$, $LiNiO_2$, $LiMn_2O_4$, $LiCoPO_4$, $LiFePO_4$, and $LiNi_aMn_bCo_cO_2$ (where, $0<a, b, c<1$) may be used as the positive electrode active material, but the present invention is not limited thereto.

The binder is for securing adhesion between the active materials or adhesion of the active material to the current collector, wherein common binders used in the art may be used, and types thereof are not particularly limited. The binder, for example, may include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, a styrene-butadiene rubber (SBR), a fluorine rubber, or copolymers thereof, and any one thereof or a mixture of two or more thereof may be used.

The binder may be included in an amount of 5 wt % or less, for example, 1 wt % to 3 wt % based on a total solid content in the positive electrode slurry composition. In a case in which the amount of the binder satisfies the above range, excellent electrode adhesion may be achieved while minimizing an increase in resistance of the electrode.

The solvent is for mixing each component in the positive electrode slurry composition and adjusting viscosity, wherein, for example, water, an organic solvent, or a mixture thereof may be used. Examples of the organic solvent may be amide-based polar organic solvents such as dimethylformamide (DMF), diethyl formamide, dimethyl acetamide (DMAc), and N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol mono methyl ether, diethylene glycol mono methyl ether, triethylene glycol mono methyl ether, tetra ethylene glycol mono methyl ether, ethylene glycol mono ethyl ether, diethylene glycol mono ethyl ether, triethylene glycol mono ethyl ether, tetra ethylene glycol mono ethyl ether, ethylene glycol mono butyl ether, diethylene glycol mono butyl ether, triethylene glycol mono butyl ether, or tetra ethylene glycol mono butyl ether; ketones such as acetone, methyl ethyl ketone, methylpropyl ketone, or cyclopentanone; and esters such as ethyl acetate, γ-butyl lactone, and ε-propiolactone, and any one thereof or a mixture of two or more thereof may be used, but the present invention is not limited thereto.

The solvent may be included in an amount such that the solid content in the positive electrode slurry composition is in a range of 30 wt % to 85 wt %, for example, 30 wt % to 80 wt %. In a case in which the solid content in the positive electrode slurry composition is less than 30 wt %, processing costs may increase due to a decrease in electrode loading amount, electrode adhesion may be reduced due to the occurrence of binder migration, and coating defects may occur. In a case in which the solid content in the positive electrode slurry is greater than 85 wt %, since viscosity of the positive electrode slurry composition is excessively increased, processability may be reduced and coating defects may occur.

The conductive agent is a component for further improving conductivity, wherein conductive agents for a secondary battery well known in the art, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used without limitation.

The conductive agent may be included in an amount of wt % or less, preferably 0.1 wt % to 10 wt %, and more preferably 0.1 wt % to 5 wt % based on the total solid content in the positive electrode slurry composition.

The positive electrode collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode collector may typically have a thickness of 3 μm to 500 μm and may have a surface with fine roughness to improve adhesion to the positive electrode material. The positive electrode collector may be used in various shapes, for example, a film, a sheet, a foil, a net, a porous body, a foam body, a non-woven fabric body, and the like.

Next, the separator separates the negative electrode and the positive electrode and provides a movement path of lithium ions, wherein any separator may be used as the separator without particular limitation as long as it is typically used in a secondary battery. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Next, the electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt due to high dielectric constants as high-viscosity organic solvents, and thus, the ring-type carbonate may be preferably used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium salt may be used as the metal salt, and the lithium salt is a material that is readily soluble in the non-aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3$—, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

As described above, the lithium secondary battery including the negative electrode, which is prepared by using the negative electrode slurry composition of the present invention including the silicon-based negative electrode active material having large theoretical capacity and the carbon nanotubes having a large specific surface area, has excellent capacity characteristics and cycle characteristics. As a result, the lithium secondary battery may be suitably used in portable devices, such as mobile phones, notebook computers, and digital cameras, and electric cars such as hybrid electric vehicles (HEVs).

Hereinafter, the present invention will be described in more detail, according to specific examples.

Example 1

After 1 kg of a mixture was prepared by mixing 0.4 wt % of single-walled carbon nanotubes (TUBALL, OCSiAl) having a specific surface area of 1,160 $m^2/g$, 0.45 wt % of polyvinyl pyrrolidone (K15, Zhangzhou Huafu Chemical Co., Ltd.) as a polymer dispersant, 0.15 wt % of tannic acid (Sigma-Aldrich Co.) as a phenolic compound containing two or more aromatic rings, and water as a solvent, the mixture was treated for 30 minutes at 10,000 rpm using a high-shear in-line mixer Verso (Silverson), and then treated four times at a pressure of 1,500 bar using PICOMAX equipment (high pressure homogenizer) by Micronox to prepare a carbon nanotube dispersion.

Example 2

A carbon nanotube dispersion was prepared in the same manner as in Example 1 except that 0.375 wt % of polyvinyl pyrrolidone (K15, Zhangzhou Huafu Chemical Co., Ltd.), as a polymer dispersant, and 0.125 wt % of tannic acid (Sigma-Aldrich Co.), as a phenolic compound containing two or more aromatic rings, were mixed.

Example 3

A carbon nanotube dispersion was prepared in the same manner as in Example 1 except that 0.54 wt % of polyvinyl pyrrolidone (K15, Zhangzhou Huafu Chemical Co., Ltd.), as a polymer dispersant, and 0.06 wt % of tannic acid (Sigma-Aldrich Co.), as a phenolic compound containing two or more aromatic rings, were mixed.

Example 4

A carbon nanotube dispersion was prepared in the same manner as in Example 1 except that 0.4 wt % of polyvinyl pyrrolidone (K15, Zhangzhou Huafu Chemical Co., Ltd.), as a polymer dispersant, and 0.1 wt % of tannic acid (Sigma-Aldrich Co.), as a phenolic compound containing two or more aromatic rings, were mixed.

Example 5

A carbon nanotube dispersion was prepared in the same manner as in Example 1 except that 0.1 wt % of single-walled carbon nanotubes (ZEON CORPORATION) having a specific surface area of 920 $m^2/g$, 0.1125 wt % of polyvinyl pyrrolidone (K15, Zhangzhou Huafu Chemical Co., Ltd.) as a polymer dispersant, and 0.0375 wt % of tannic acid (Sigma-Aldrich Co.), as a phenolic compound containing two or more aromatic rings, were mixed.

Example 6

A carbon nanotube dispersion was prepared in the same manner as in Example 1 except that 0.45 wt % of polyethyleneimine (Sigma-Aldrich Co., Mw=2,000 g/mol), as a polymer dispersant, and 0.15 wt % of tannic acid (Sigma-Aldrich Co.), as a phenolic compound containing two or more aromatic rings, were mixed.

Example 7

A carbon nanotube dispersion was prepared in the same manner as in Example 1 except that 0.45 wt % of polyvinyl pyrrolidone (K15, Zhangzhou Huafu Chemical Co., Ltd.), as a polymer dispersant, and 0.15 wt % of epigallocatechin gallate (Sigma-Aldrich Co.), as a phenolic compound containing two or more aromatic rings, were mixed.

Example 8

A carbon nanotube dispersion was prepared in the same manner as in Example 1 except that 1 kg of a mixture was prepared by mixing 0.8 wt % of single-walled carbon nanotubes (TUBALL, OCSiAl) having a specific surface area of 1,160 $m^2/g$, 0.9 wt % of polyvinyl pyrrolidone (K15, Zhangzhou Huafu Chemical Co., Ltd.) as a polymer dispersant, 0.3 wt % of tannic acid (Sigma-Aldrich Co.) as a phenolic compound containing two or more aromatic rings, and water as a solvent.

Comparative Example 1

A carbon nanotube dispersion was prepared in the same manner as in Example 1 except that the tannic acid was not used and 0.6 wt % of polyvinyl pyrrolidone was mixed in Example 1.

Comparative Example 2

A carbon nanotube dispersion was prepared in the same manner as in Example 1 except that the polyvinyl pyrrolidone was not used and 0.6 wt % of tannic acid was mixed in Example 1.

Comparative Example 3

A carbon nanotube dispersion was prepared in the same manner as in Example 1 except that 0.6 wt % of carboxymethyl cellulose (CMC, Daicel Corporation), instead of the polyvinyl pyrrolidone and tannic acid, was mixed in Example 1.

Comparative Example 4

A carbon nanotube dispersion was prepared in the same manner as in Example 1 except that 0.45 wt % of carboxymethyl cellulose (CMC, Daicel Corporation), instead of the polyvinyl pyrrolidone, was used in Example 1.

Comparative Example 5

After 1 kg of a mixture was prepared by mixing 4 wt % of multi-walled carbon nanotubes having a specific surface area of 185 $m^2/g$, 0.8 wt % of polyvinyl pyrrolidone (K15, Zhangzhou Huafu Chemical Co., Ltd.), and water as a solvent, the mixture was treated for 30 minutes at 10,000 rpm using a high-shear in-line mixer Verso (Silverson), and then treated four times at a pressure of 1,500 bar using PICOMAX equipment (high pressure homogenizer) by Micronox to prepare a carbon nanotube dispersion.

Comparative Example 6

After 1 kg of a mixture was prepared by mixing 2 wt % of multi-walled carbon nanotubes having a specific surface area of 370 $m^2/g$, 0.4 wt % of polyvinyl pyrrolidone (K15, Zhangzhou Huafu Chemical Co., Ltd.), and water as a solvent, the mixture was treated for 30 minutes at 10,000 rpm using a high-shear in-line mixer Verso (Silverson), and then treated four times at a pressure of 1,500 bar using PICOMAX equipment (high pressure homogenizer) by Micronox to prepare a carbon nanotube dispersion.

Experimental Example 1: Evaluation of Viscosity of Carbon Nanotube Dispersion

Initial viscosities of the carbon nanotube dispersions of Examples 1 to 8 and Comparative Examples 1 to 6 were measured, and viscosities after the carbon nanotube dispersions were left standing at 25° C. for 1 week were measured again to measure viscosity increase rates. The viscosity increase rate was calculated by the following Equation (1).

Viscosity increase rate (%)={(viscosity after left standing for 1 week−initial viscosity)/initial viscosity}×100 Equation (1):

Measurement results are presented in Table 1 below.

The viscosity was measured at 25° C. and 1 rpm using a viscometer (viscometer TV-22, manufactured by TOKI SANGYO CO., LTD.).

TABLE 1

| | Carbon nanotube | | Polymer | Phenolic | Viscosity (Pa · s) | | |
|---|---|---|---|---|---|---|---|
| | BET ($m^2/g$) | Amount (wt %) | dispersant (wt %) | compound (wt %) | Initial | After 1 week | Increase rate (%) |
| Example 1 | 1160 | 0.4 | PVP 0.45 | Tannic acid 0.15 | 1.42 | 1.43 | 0.70 |
| Example 2 | 1160 | 0.4 | PVP 0.375 | Tannic acid 0.125 | 1.86 | 2.01 | 8.06 |
| Example 3 | 1160 | 0.4 | PVP 0.54 | Tannic acid 0.06 | 1.80 | 1.90 | 5.56 |
| Example 4 | 1160 | 0.4 | PVP 0.40 | Tannic acid 0.1 | 1.55 | 1.81 | 16.77 |
| Example 5 | 920 | 0.1 | PVP 0.1125 | Tannic acid 0.0375 | 0.44 | 0.44 | 0.00 |
| Example 6 | 1160 | 0.4 | Polyethyleneimine 0.45 | Tannic acid 0.15 | 1.91 | 2.07 | 8.38 |
| Example 7 | 1160 | 0.4 | PVP 0.45 | Epigallocatechin gallate 0.15 | 1.60 | 1.82 | 13.75 |
| Example 8 | 1160 | 0.8 | PVP 0.9 | Tannic acid 0.3 | 10.5 | 10.5 | 0.00 |
| Comparative Example 1 | 1160 | 0.4 | PVP 0.6 | 0 | 13.34 | 24.95 | 87.03 |
| Comparative Example 2 | 1160 | 0.4 | 0 | Tannic acid 0.6 | — | — | — |
| Comparative Example 3 | 1160 | 0.4 | CMC 0.6 | 0 | 8.45 | 15.50 | 83.43 |
| Comparative Example 4 | 1160 | 0.4 | CMC 0.45 | Tannic acid 0.15 | 6.10 | 11.75 | 92.62 |
| Comparative Example 5 | 185 | 4.0 | PVP 0.8 | 0 | 5.80 | 13.60 | 134.38 |
| Comparative Example 6 | 370 | 2.0 | PVP 0.4 | 0 | 9.15 | 23.50 | 156.83 |

As illustrated in Table 1, the carbon nanotube dispersions of Examples 1 to 8 according to the present invention exhibited excellent storage stabilities due to low viscosity increase rates even after storage for one week and also exhibited low initial viscosities. In contrast, with respect to the carbon nanotube dispersions of Comparative Examples 1 and 3 to 6, since viscosity increase rates after storage for one week were relatively high at 80% or more, storage stabilities were low.

Since agglomeration occurred in the carbon nanotube dispersion of Comparative Example 2, viscosity measurement was not possible.

Example 11

A negative electrode slurry composition (solid content 44 wt %) was prepared by mixing a negative electrode active material (weight ratio of graphite:SiO=85:15), a styrene-butadiene rubber (SBR) binder, carboxymethyl cellulose (CMC), and the carbon nanotube dispersion prepared in Example 1 in water such that a weight ratio of the negative electrode active material:the carbon nanotubes:the PVP:the tannic acid:the CMC:the SBR binder was 98:0.05:0.05625:0.01875:0.925:0.95. A 15 μm thick negative electrode collector (Cu thin film) was coated with the negative electrode slurry composition, dried, and roll-pressed to prepare a negative electrode.

(Positive Electrode Preparation)

A positive electrode active material (NCM 811), a conductive agent (carbon black), and a binder (polyvinylidene fluoride, PVDF) were mixed in N-methyl-2-pyrrolidone (NMP) at a weight ratio of 97.08:1.6:1.32 to prepare a positive electrode slurry composition (solid content 70 wt %). A 25 μm thick positive electrode collector (Al thin film) was coated with the positive electrode active material slurry, dried, and roll-pressed to prepare a positive electrode.

(Secondary Battery Preparation)

After an electrode assembly was prepared by a conventional method of sequentially stacking a polyethylene porous film with the positive electrode and negative electrode prepared as described above, the electrode assembly was put in a pouch-type secondary battery case, and the above-prepared non-aqueous electrolyte was injected thereinto to prepare a lithium secondary battery.

Example 12

A positive electrode, a negative electrode, and a lithium secondary battery were prepared in the same manner as in Example 11 except that the carbon nanotube dispersion prepared by Example 5, instead of the carbon nanotube dispersion prepared by Example 1, was used.

Comparative Example 7

A positive electrode, a negative electrode, and a lithium secondary battery were prepared in the same manner as in Example 11 except that the carbon nanotube dispersion prepared by Comparative Example 5, instead of the carbon nanotube dispersion prepared by Example 1, was used.

Comparative Example 8

A positive electrode, a negative electrode, and a lithium secondary battery were prepared in the same manner as in Example 11 except that the carbon nanotube dispersion prepared by Comparative Example 6, instead of the carbon nanotube dispersion prepared by Example 1, was used.

Experimental Example 2

Charging of each of the lithium secondary batteries prepared by Examples 11 and 12 and Comparative Examples 7 and 8 at 1 C to 4.2 V under a constant current/constant voltage (CC/CV) condition at 25° C. and then discharging of each lithium secondary battery at a constant current (CC) of 1 C to 2.0 V were set as one cycle, and 100 cycles of the charging and discharging were performed to measure a capacity retention.

In this case, the capacity retention was calculated according to the following Equation (1), and measurement results are presented in [Table 2] below.

Capacity retention (%)=(discharge capacity after 100 cycles/discharge capacity after one cycle)×100     Equation (1):

TABLE 2

| | Capacity retention (%) |
|---|---|
| Example 11 | 91.7 |
| Example 12 | 89.4 |
| Comparative Example 7 | 79.7 |
| Comparative Example 8 | 81.1 |

As illustrated in Table 2, the lithium secondary batteries of Examples 11 and 12 respectively using the carbon nanotube dispersions of Examples 1 and 5 of the present invention had significantly better cycle characteristics than the lithium secondary batteries of Comparative Examples 7 and respectively using the carbon nanotube dispersions of Comparative Examples 5 and 6 containing the multi-walled carbon nanotubes with a low specific surface area.

The invention claimed is:

1. A carbon nanotube dispersion comprising carbon nanotubes (CNT) having a Brunauer-Emmett-Teller (BET) specific surface area of 800 $m^2/g$ or more, a dispersant, and a water-based solvent, wherein the dispersant comprises a polymer dispersant containing an amine and a phenolic compound containing two or more aromatic rings, and wherein the phenolic compound is included in an amount of 1 part by weight to 100 parts by weight based on 100 parts by weight of the polymer dispersant containing an amine.

2. The carbon nanotube dispersion of claim 1, wherein the carbon nanotube is a single-walled carbon nanotube, a double-walled carbon nanotube, or a combination thereof.

3. The carbon nanotube dispersion of claim 1, wherein the carbon nanotubes are included in an amount of 0.01 wt % to 5 wt % based on a total weight of the carbon nanotube dispersion.

4. The carbon nanotube dispersion of claim 1, wherein the dispersant is included in an amount of 10 parts by weight to 2,000 parts by weight based on 100 parts by weight of the carbon nanotubes.

5. The carbon nanotube dispersion of claim 1, wherein the polymer dispersant comprises at least one selected from the group consisting of polyvinylpyrrolidone, polyacrylic acid hydrazide, poly-N-vinyl-5-methoxazolidon, N-alkyl polyimine, N-acetyl polyimine, polyacrylamide, poly-L-lysine hydrobromide, benzyl-dodecyl-dimethylammonium chloride, and polyethylenimine.

6. The carbon nanotube dispersion of claim 1, wherein the phenolic compound comprises at least one structure selected from the group consisting of a phenolic structure, a catechol structure, a gallol structure, and a naphthol structure in at least one of the aromatic rings.

7. The carbon nanotube dispersion of claim 1, wherein the phenolic compound does not comprise a structure in which three or more aromatic rings are fused in a molecular structure.

8. The carbon nanotube dispersion of claim 1, wherein the phenolic compound containing two or more aromatic rings comprises at least one selected from the group consisting of baicalin, luteolin, taxifolin, myricetin, quercetin, rutin, catechin, epigallocatechin gallate, butein, piceatannol, and tannic acid.

9. The carbon nanotube dispersion of claim 1, wherein the carbon nanotube dispersion has a viscosity increase rate represented by Equation (1) of 80% or less Viscosity increase rate (%)=((viscosity measured after left standing at 25° C. for 1 week-initial viscosity)/initial viscosity)×100     Equation (1)

10. The carbon nanotube dispersion of claim 1, wherein the carbon nanotube dispersion has an initial viscosity, which is measured at 25° C. and 1 rpm, of 0.1 Pa·s to 12 Pa·s.

11. A negative electrode slurry composition comprising the carbon nanotube dispersion of claim 1, a silicon-based negative electrode active material, and a binder.

12. A negative electrode comprising a negative electrode active material layer formed by the negative electrode slurry composition of claim 11.

13. A lithium secondary battery comprising the negative electrode of claim 12.

14. The carbon nanotube dispersion of claim 1, wherein the BET specific surface area is from 800 $m^2/g$ to 5,000 $m^2/g$.

* * * * *